United States Patent
Panasik

(10) Patent No.: US 6,587,689 B1
(45) Date of Patent: Jul. 1, 2003

(54) MULTI-SENSOR ASSISTED CELLULAR HANDOFF TECHNIQUE

(75) Inventor: Carl M. Panasik, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/377,425

(22) Filed: Aug. 19, 1999

(51) Int. Cl.⁷ .......................... H04Q 7/20; H04B 7/185; G01C 21/26
(52) U.S. Cl. .................. 455/440; 455/438; 455/456; 701/217; 342/357.09
(58) Field of Search ................. 455/436–444, 455/456; 370/331, 332; 701/217, 300, 202; 340/992, 993, 994, 991, 989; 342/357.07–357.09

(56) References Cited

U.S. PATENT DOCUMENTS

| | | | |
|---|---|---|---|
| 3,947,807 A | * 3/1976 | Tyler et al. ................ | 340/992 |
| 5,398,276 A | * 3/1995 | Lemke et al. .............. | 455/446 |
| 5,432,842 A | * 7/1995 | Kinoshita et al. .......... | 455/436 |
| 5,440,484 A | * 8/1995 | Kao ........................... | 364/457 |
| 5,479,482 A | * 12/1995 | Grimes ...................... | 455/404 |
| 5,825,283 A | * 10/1998 | Camhi ....................... | 340/438 |
| 5,878,328 A | * 3/1999 | Chawla et al. ............. | 455/67.1 |
| 5,893,033 A | * 4/1999 | Keskitalo et al. ........... | 455/437 |
| 5,917,436 A | * 6/1999 | Endo et al. ................. | 340/995 |
| 5,945,948 A | * 8/1999 | Buford et al. .............. | 342/357 |
| 6,038,444 A | * 3/2000 | Schipper et al. ........... | 455/456 |
| 6,052,598 A | * 4/2000 | Rudrapatna et al. ....... | 455/456 |
| 6,061,337 A | * 5/2000 | Brassart et al. ............ | 370/331 |
| 6,138,021 A | * 10/2000 | Arrington, Jr. et al. ..... | 455/436 |
| 6,188,904 B1 | * 2/2001 | Marsan ....................... | 455/450 |
| 6,212,381 B1 | * 4/2001 | Oda ........................... | 455/441 |
| 6,249,246 B1 | * 6/2001 | Bode et al. ................. | 342/357 |
| 6,298,306 B1 | * 10/2001 | Suarez et al. .............. | 701/213 |
| 6,470,186 B1 | * 10/2002 | Whikehart et al. ......... | 455/456 |

FOREIGN PATENT DOCUMENTS

WO   WO 99/16276   * 4/1999   ............ H04Q/7/38

OTHER PUBLICATIONS

Handoff Algorithms Using Pattern Recognition, Donald Cox, Final Report dated Sep. 1996–Jun. 1998, pp. 1–12, (Publication date unknown by Applicant).

* cited by examiner

*Primary Examiner*—Duc Nguyen
(74) *Attorney, Agent, or Firm*—Ronald O. Neerings; Wade James Brady, III; Frederick J. Telecky, Jr.

(57) ABSTRACT

A system and method for assisting in handoff in a cellular communication system. The system includes a base station having a data base of patterns of known handoff to predetermined different base stations and a mobile cellular device having apparatus for indicating the direction of a change of direction of the mobile device and circuitry for providing a signal to the base station indicative of the direction of change of direction. Circuitry is provided at the base station responsive to the signal to the base station indicative of the direction of change of direction to select the different base station for handoff of the mobile cellular device. The apparatus for indicating the direction of change of direction of the mobile device is one of a gyroscope, an accelerometer, an electronic compass, the GPS or a device determining direction based upon the magnetic field of the earth.

18 Claims, 2 Drawing Sheets

MULTI-SENSOR ASSISTED CELLULAR HANDOFF TECHNIQUE

FIELD OF THE INVENTION

This invention relates to a method and apparatus for performing handoff in mobile cellular systems such as, but not limited to code division multiple access (CDMA) systems.

BACKGROUND AND BRIEF DESCRIPTION OF THE PRIOR ART

In the field of wireless communication using mobile devices and plural spaced apart base stations, communication generally takes place between a mobile device and one of the base stations. As the mobile device moves among the plural base stations, the strength of the communication or power output the mobile device received at the first base station with which the mobile device is then communicating is measured. The strength of this signal will eventually diminish and the strength of the signal to a second of the plural base stations will increase. At some point the strength of the signal from the second base station will become stronger than the signal from the first base station whereupon communication between the mobile device and the second base station will commence and communication between the mobile device and the first base station will cease. The transfer is known in the art as "handoff" and the action is made in the network by coordinating the original base/mobile station and the new base/mobile station. In CDMA, the measurement of signal strength of the signal received at the mobile device can be made at the mobile device with the mobile device assisting in the handoff procedure.

When traveling away from a first base station with which communication is taking place, the path of the mobile device often results in travel toward second, third and possibly additional base stations which may be substantially equidistant from the mobile device at the time handoff is required. A handoff choice must then be made as to one of these base stations though insufficient information is available at the time handoff is required to determine which of these available and selected candidates for handoff is the correct or best available candidate for handoff. Even if the mobile device makes a turn toward one of the second, third and possibly additional base stations at the time handoff is required, which would have resulted in handoff to that one station, the network often does not become aware of this change of direction until long after handoff has been made. In addition, handoff is generally made to the candidate providing the strongest signal at that point in time, though that candidate may ultimately not be the best candidate due to the new direction being taken by the mobile device. When the handoff is not to the best base station, a further handoff is then required which should have been unnecessary, thereby unnecessarily tying up at least one of the base stations and losing a portion of its service (capacity) for a period of time. In addition, excess network traffic is incurred along with the possibility of a dropped call increasing with each handoff.

Handoff algorithms using pattern recognition are presently being developed wherein the base station collects received signal level information for the mobile device as a function of time (or distance, if equipped with the appropriate sensors) which varies with fading, shadowing and the essentially constant signal affecting environment. Using previously stored data, the base station employs pattern recognition to determine to which other base station the mobile device will be connected after handoff. Each microcell or base station has a database of signal level patterns and compares these stored patterns with the incoming information from the mobile device. When the mobile device approaches a pattern whereby it is known that handoff to another base station should soon take place, the network is notified and handoff to the appropriate new base station is assisted by this information. It is assumed that the environment (reflections from buildings and other objects) does not change with time. This type of system also suffers from the same handoff problem, to the wrong base station, as set forth above.

It is therefore apparent that a handoff technique is desirable which can determine the direction of the mobile device immediately prior to handoff so that handoff can take place with the most desirable base station out of a plurality of possible base station candidates for handoff.

SUMMARY OF THE INVENTION

In accordance with the present invention, the above described problem inherent in the prior art is minimized and there is provided a system for handoff which determines the most favorable base station to which handoff should be made prior to handoff.

Briefly, the above is accomplished by determining if a change of direction of the mobile device is taking place as well as the direction of the change of the mobile device. This is accomplished by, for example, a micro-machined gyroscope, an accelerometer, an electronic compass, devices determining direction based upon the magnetic field of the earth, and the like. These are techniques which work in a practical manner in the urban environment. The Global Positioning System (GPS) does not accurately determine heading or position in the urban, street-level, environment. The directional information is fed back to the base station and allows the base station to determine which one of plural candidates for handoff should be selected. In accordance with the present invention, ambiguity in the multi-base station environment is removed. The network switching traffic is lowered dramatically by directly choosing the correct new base station from the measurement of the direction of the mobile device and the pattern recognition at the original base station. The invention is accomplished by providing a micro-machined gyroscope internal to the mobile device to provide turning information to the network. A three dimensional capacitive-based accelerometer sensor can provide the velocity information to discern relative distance information for the basic pattern generation.

DESCRIPTION OF THE PREFERRED EMBODIMENT

Figure 1:
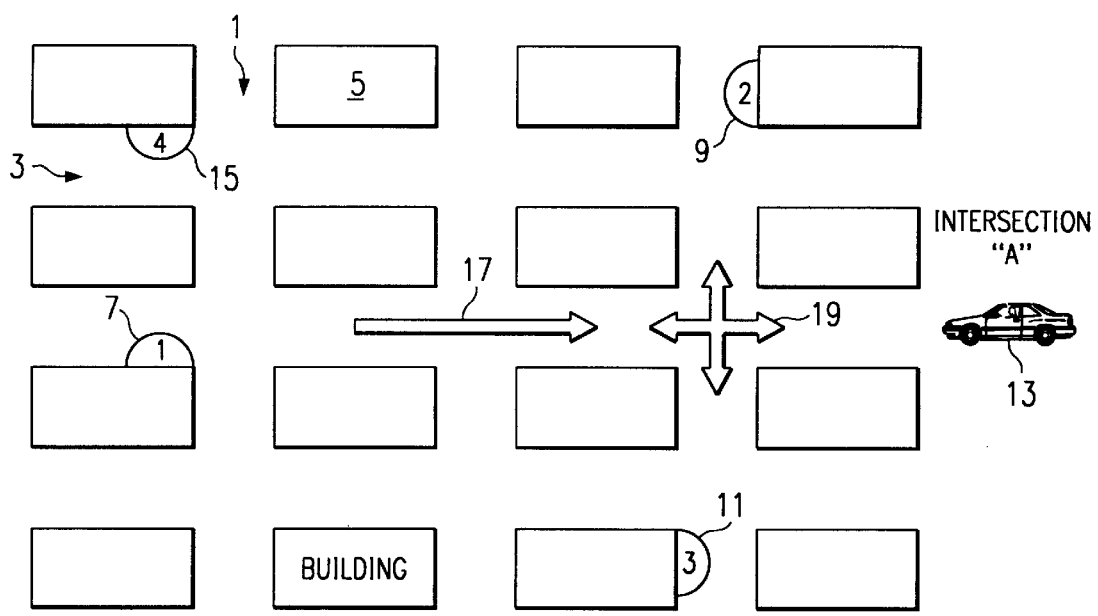
FIG. 1 is a diagram showing a typical urban environment with streets, buildings and multiple base stations for communication with mobile communication devices, such as cellular telephones.

Referring first to FIG. 1, there is shown a typical urban region having north-south 1 and east-west 3 extending thoroughfares with buildings 5 in the regions between the thoroughfares. Some or all of the buildings 5 may be of the type that shield and/or cause reflection of electromagnetic radiations. Microcells or base stations 7, 9, 11, 13, 15 are positioned at spaced apart locations within the urban region. Each of the base stations has a data base of known power received patterns and determines by comparison of the power pattern received from a mobile device (not shown) with the data base patterns the direction of travel of the mobile device and the base stations toward which it is traveling. Accordingly, the base station 7 will know that the mobile device with which it is presently communicating is traveling in the direction of the arrow 17 toward the intersection 19 and base stations 9, 11 and 13. The mobile device may, for example, be blocked from communication with the base station 15 by the buildings 5. As the mobile device approaches the intersection 19, the pattern of the signal fed back to base station 7 by the mobile device due to reflection and other signal affecting phenomena is matched with a data base at the base station 7 to indicate that handoff is to take place to one of base stations 9, 11 or 13. (It is assumed that the mobile device is not making a U-turn, otherwise base station 7 would remain a candidate for communication with the mobile device and possibly not provide a handoff.) The handoff is not made until the mobile device does one of the following: continue through the intersection 19 toward base station 13, make a left hand turn toward base station 9 or make a right hand turn toward base station 11. At the time of movement of the mobile device through the intersection 19, the condition of a gyroscope (or other internal sensor) within the mobile device is determined. The gyroscope determines whether the mobile device is now traveling toward base station 9, 11 or 13 and sends a signal back to the base station 7 with which it is presently in communication indicative of the direction of mobile device travel. The base station 7 now determines the correct base station for handoff and provides the correct handoff immediately after movement of the mobile device through the intersection 19.

Figure 2:
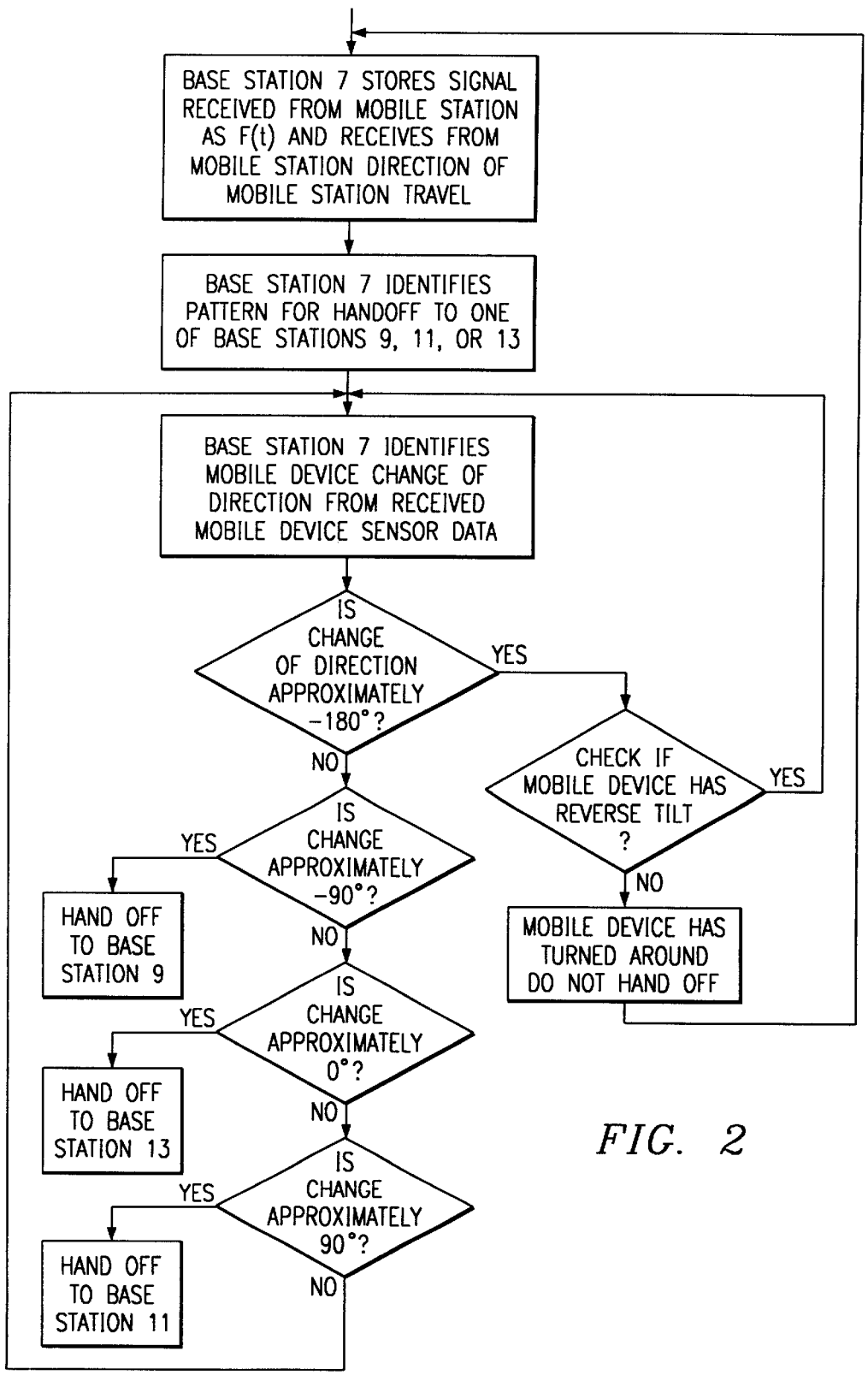
FIG. 2 is a logic diagram to perform the functions required in the communication system of FIG. 1.

Referring now to FIG. 2, there is shown a logic diagram demonstrating the functions required in the communication system of FIG. 1. The base station 7, with which the mobile device is presently in communication, receives and stores an indication of the signal level received from the mobile device as a function of time and also receives from the mobile device an indication of the direction of travel of the mobile station. The base station 7 identifies from a data base therein a pattern for handoff of the mobile device to one base station 9, 11 or 13. Base station 7 identifies the change of direction from the sensor data received from the mobile device.

If there is a 180 degree change of direction of the mobile device, a check is made to determine whether the mobile device has a reversed tilt. If not, the mobile device has turned around and there is no need for handoff. If it has both 180° change and reverse tilt, the base station continues to identify from the data base therein a pattern for handoff of the mobile device as before.

If there is not a 180 degree change of direction of the mobile device, a determination is made whether or not the change is −90 degrees. If the result is "yes", then handoff takes place to base station 9. If the result is "no", then a determination is made whether there has been no change in direction or 0 degrees. If the result is "yes", then handoff is made to base station 13. If the result is "no", then a determination is made whether there has been a 90 degree change in direction. If the result is "yes", then handoff is made to base station 11. If the result in "no", then base station 7 proceeds to identify a change in direction as above.

Though the invention has been described with reference to a preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A system for assisting in handoff in a cellular communication system having a plurality of base stations for communication with mobile cellular devices, comprising:
   (a) a first base station of said plurality of base stations having a data base of patterns of known handoffs to predetermined different base stations of said plurality of base stations;
   (b) a mobile cellular device having:
      (i) apparatus for indicating the direction of a change of direction of said mobile device;
      (ii) circuitry for providing a signal to said first base station indicative of said direction of a change of direction; and
   (c) circuitry at said first base station responsive to said signal to said first base station from said mobile cellular device indicative of said direction of a change of direction of said mobile cellular device and responsive to said data base of patterns at said first base station to select a different base station of said plurality of base stations for handoff of said mobile cellular device.

2. The system of claim 1 wherein said apparatus for indicating the direction of a change of direction of said mobile device is a gyroscope.

3. The system of claim 1 wherein said apparatus for indicating the direction of a change of direction of said mobile device is an accelerometer.

4. The system of claim 1 wherein said apparatus for indicating the direction of a change of direction of said mobile device is an electronic compass.

5. The system of claim 1 wherein said apparatus for indicating the direction of a change of direction of said mobile device is a device determining change of direction based upon the GPS.

6. The system of claim 1 wherein said apparatus for indicating the direction of a change of direction of said mobile device is a device determining direction based upon the magnetic field of the earth.

7. A method for assisting in handoff in a cellular communication system having a plurality of base stations for communication with mobile cellular devices, comprising:
   (a) providing a first base station of said plurality of base stations having a data base of patterns of known handoff to predetermined different base stations of said plurality of base stations;
   (b) providing a mobile cellular device having:
      (i) apparatus for indicating the direction of a change of direction of said mobile device;
      (ii) circuitry for providing a signal to said first base station indicative of said direction of change of direction and a said pattern from said data base at said first base station; and
   (c) responsive to said signal to said first base station from said mobile cellular device indicative of a direction of said change of direction of said mobile cellular device and responsive to said pattern from said data base, selecting a different base station of said plurality of base stations for handoff of said mobile cellular device.

8. The method of claim 7 wherein said apparatus for indicating the direction of a change of direction of said mobile device is a gyroscope.

9. The method of claim 7 wherein said apparatus for indicating the direction of a change of direction of said mobile device is an accelerometer.

10. The method of claim 7 wherein said apparatus for indicating the direction of a change of direction of said mobile device is an electronic compass.

11. The method of claim 7 wherein said apparatus for indicating the direction of a change of direction of said mobile device is a device determining direction based upon the magnetic field of the earth.

12. The method of claim 7 where said apparatus for indicating the direction of a change of direction of said mobile device is a device determining direction based upon the GPS.

13. A mobile cellular device capable of selective concurrent communication of information to and from a base station, which comprises:
 (a) a mobile device having a transmitter for transmitting data to a base station and a receiver for concurrently receiving data from a base station;
 (b) apparatus at said mobile device for non-manually indicating the direction of a change of direction of said mobile device; and
 (c) said transmitter at said mobile device including circuitry which, when communicating with a base station, continuously provides indicia of said direction of a change of direction of said mobile device to a base station.

14. The device of claim 13 wherein said apparatus for indicating the direction of a change of direction of said mobile device is a gyroscope.

15. The device of claim 13 wherein said apparatus for indicating the direction of a change of direction of said mobile device is an accelerometer.

16. The device of claim 13 wherein said apparatus for indicating the direction of a change of direction of said mobile device is an electronic compass.

17. The device of claim 13 wherein said apparatus for indicating the direction of a change of direction of said mobile device is a device determining direction based upon the magnetic field of the earth.

18. The device of claim 13 wherein said apparatus for indicating the direction of a change of direction of said mobile device is a device determining direction based upon the GPS.

* * * * *